(12) United States Patent
Lindskog et al.

(10) Patent No.: US 10,762,655 B1
(45) Date of Patent: Sep. 1, 2020

(54) DISPARITY ESTIMATION USING SPARSELY-DISTRIBUTED PHASE DETECTION PIXELS

(71) Applicant: Apple Inc., Cupertino, CA (US)

(72) Inventors: Alexander Lindskog, San Jose, CA (US); Michael W. Tao, San Jose, CA (US); Mark N. Jouppi, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/567,581

(22) Filed: Sep. 11, 2019

Related U.S. Application Data (60) Provisional application No. 62/729,522, filed on Sep. 11, 2018.

(51) Int. Cl.
*H04N 13/271* (2018.01)
*G06T 7/571* (2017.01)
*H04N 5/369* (2011.01)

(52) U.S. Cl.
CPC .......... *G06T 7/571* (2017.01); *H04N 5/36961* (2018.08); *H04N 13/271* (2018.05); *G06T 2207/10028* (2013.01)

(58) Field of Classification Search
CPC .............................. H04N 13/128; G01S 17/89
See application file for complete search history.

(56) References Cited

U.S. PATENT DOCUMENTS

| | | | |
|---|---|---|---|
| 9,704,250 B1 | 7/2017 | Shah | |
| 10,116,917 B2* | 10/2018 | Nishiyama | ............... G06T 5/002 |
| 10,122,993 B2* | 11/2018 | Venkataraman | ........... G01P 3/38 |
| 10,268,232 B2* | 4/2019 | Harris | ...................... G02F 3/024 |
| 2004/0213460 A1 | 10/2004 | Chen | |
| 2016/0035069 A1* | 2/2016 | Min | ......................... G06T 5/007 382/266 |
| 2019/0362511 A1* | 11/2019 | Jouppi | ..................... G06T 5/002 |
| 2020/0082535 A1* | 3/2020 | Lindskog | ............ G06K 9/00221 |
| 2020/0082541 A1* | 3/2020 | Jouppi | ..................... G06T 5/002 |

FOREIGN PATENT DOCUMENTS

CN         107135388 A        9/2017

* cited by examiner

*Primary Examiner* — Paulos M Natnael
(74) *Attorney, Agent, or Firm* — Blank Rome LLP (57) ABSTRACT

The disclosure pertains to techniques for image processing. One such technique comprises a method for image processing comprising obtaining first light information from a set of light-sensitive pixels for a scene, the pixels including phase detection (PD) pixels and non-PD pixels, generating a first PD pixel image from the first light information, the first PD pixel image having a first resolution, generating a higher resolution image from the plurality of non-PD pixels, wherein the higher resolution image has a resolution greater than the resolution of the first PD pixel image, matching a first pixel of the first PD pixel image to the higher resolution image, wherein the matching is based on a set of correlations between the first pixel and non-PD pixel within a predetermined distance of the first pixel, and determining a disparity map for an image associated with the first light information, based on the match.

24 Claims, 8 Drawing Sheets

DISPARITY ESTIMATION USING SPARSELY-DISTRIBUTED PHASE DETECTION PIXELS

This application claims priority to U.S. Provisional Application No. 62/729,522, filed Sep. 11, 2018, which is hereby incorporated by reference.

BACKGROUND

The subject matter disclosed herein relates to the field of image processing and, without limitation, techniques for improving disparity estimation using sparsely-distributed phase detection (PD) pixels.

The process of estimating the depth of a scene from two viewpoints is commonly referred to as stereoscopic vision and, when using multiple viewpoints, multi-view stereo. In practice, many camera systems use disparity as a proxy for depth. (As used herein, disparity is taken to mean the difference in the projected location of a scene point in one image compared to that same point in another image captured.) Generally, disparity can be considered the inverse of depth, such that disparity is equal to 1/depth. Depth information can be obtained using active depth sensing hardware, such as radar, lidar, time of flight cameras, structured light projectors, and the like. Depth information can also be obtained for a scene by a camera system by obtaining stereo camera images of the scene from different viewpoints and determining the disparity between the images. Camera systems with multiple cameras are often used to capture images from different viewpoints. Camera systems with a single camera can also be configured to capture images from different viewpoints, such as by physically moving the camera system, or using a different set of sensor pixels of a camera to capture the different viewpoints. With a geometrically calibrated camera system, disparity can be mapped to scene depth. The fundamental task for such camera-based depth estimation systems then is to find matches, or correspondences, of points between images from two or more images captured by the camera system of the same scene.

SUMMARY

This disclosure relates generally to the field of image processing. More particularly, but not by way of limitation, aspects of the present disclosure relate to a computer-implemented method for image processing. The method comprises obtaining first light information from a set of light-sensitive pixels for a scene, the set of light-sensitive pixels, including a plurality of phase detection (PD) pixels and a plurality of non-PD pixels and obtaining location information for the plurality of PD pixels. The method includes generating a first PD pixel image from the first light information based on location information obtained from the plurality of PD pixels, wherein the first PD pixel image has a first resolution. The method also includes generating a higher resolution image from the first light information obtained from the plurality of non-PD pixels, wherein the higher resolution image has a second resolution that is greater than the first resolution of the first PD pixel image. The method further includes matching a first pixel of the first PD pixel image to the higher resolution image, wherein the matching is based on a set of correlations between the first pixel and non-PD pixel within a predetermined distance of the first pixel. The method also includes determining a disparity map for an image associated with the first light information, based on the matching.

Another aspect of the present disclosure relates to a non-transitory program storage device comprising instructions stored thereon to cause one or more processors to obtain first light information from a set of light-sensitive pixels for a scene, the set of light-sensitive pixels including a plurality of phase detection (PD) pixels and a plurality of non-PD pixels and obtain location information for the plurality of PD pixels. The instructions further cause the one or more processors to generate a first PD pixel image from the first light information based on location information obtained from the plurality of PD pixels, wherein the first PD pixel image has a first resolution. The instructions also cause the one or more processors to a higher resolution image from the first light information obtained from the plurality of non-PD pixels, wherein the higher resolution image has a second resolution that is greater than the first resolution of the first PD pixel image. The instructions also cause the one or more processors to match a first pixel of the first PD pixel image to the higher resolution image, wherein the match is based on a set of correlations between the first pixel and non-PD pixel within a predetermined distance of the first pixel. The instructions further cause the one or more processors to determine a disparity map for an image associated with the first light information, based on the match.

Another aspect of the present disclosure relates to a non-transitory program storage device comprising instructions stored thereon to cause one or more processors to obtain first light information from a set of light-sensitive pixels for a scene, the set of light-sensitive pixels including a plurality of phase detection (PD) pixels and a plurality of non-PD pixels and to obtain location information for the plurality of PD pixels. The stored instructions further cause one or more processors to generate a first PD pixel image from the first light information based on location information obtained from the plurality of PD pixels, wherein the first PD pixel image has a first resolution. The stored instructions also cause one or more processors to obtain a higher resolution image having a second resolution greater than the first resolution of the first PD pixel image. The stored instructions also cause one or more processors to match a first pixel of the first PD pixel image to the first interpolated image based on a location of a first PD pixel to the higher resolution image, wherein the match is based on a set of correlations between the first pixel and non-PD pixel within a predetermined distance of the first pixel. The stored instructions further cause one or more processors to determine a disparity map for an image associated with the first light information, based on the match.

DETAILED DESCRIPTION

This disclosure pertains to systems, methods, and computer-readable media to improve the operation of imaging systems. More specifically, aspects of the present disclosure relate to improving disparity estimation using sparsely-distributed PD pixels (PD pixels may also be referred to as "focus pixels" or "phase detection auto-focus pixels"). PD pixels provide disparity estimates based on phase detection for a captured scene through a defocusing-dependent image shift that can be used to guide autofocusing of a camera lens. Generally, PD pixels can be sparsely-distributed across an image sensor and generate a sparsely-sampled PD pixel image. Information obtained from PD pixels is also generally underexposed and noisy, as the effective apertures of PD pixels are typically reduced, as compared to regular pixels (e.g., non-PD pixels) of the image sensor. These aspects make generating high quality disparity maps using information from PD pixels challenging. Precise sampling and correspondence of information based on locations of the PD pixels to information from a full resolution image from the image sensor helps allow robust disparity maps to be generated based on information from the PD pixels.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the claimed subject matter, leaving resorting to the claims as a potential necessity to determine such claimed subject matter. Reference in this disclosure to "one embodiment" or to "an embodiment" or "embodiments" means that a particular feature, structure, or characteristic described in connection with the embodiment is included in at least one embodiment of the disclosed subject matter, and multiple references to "'one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nonetheless be a routine undertaking for those having the benefit of this disclosure and being of ordinary skill in the design and implementation of graphical processor interface software or graphical processing systems.

Phase Detection (PD) Pixels

Figure 1:
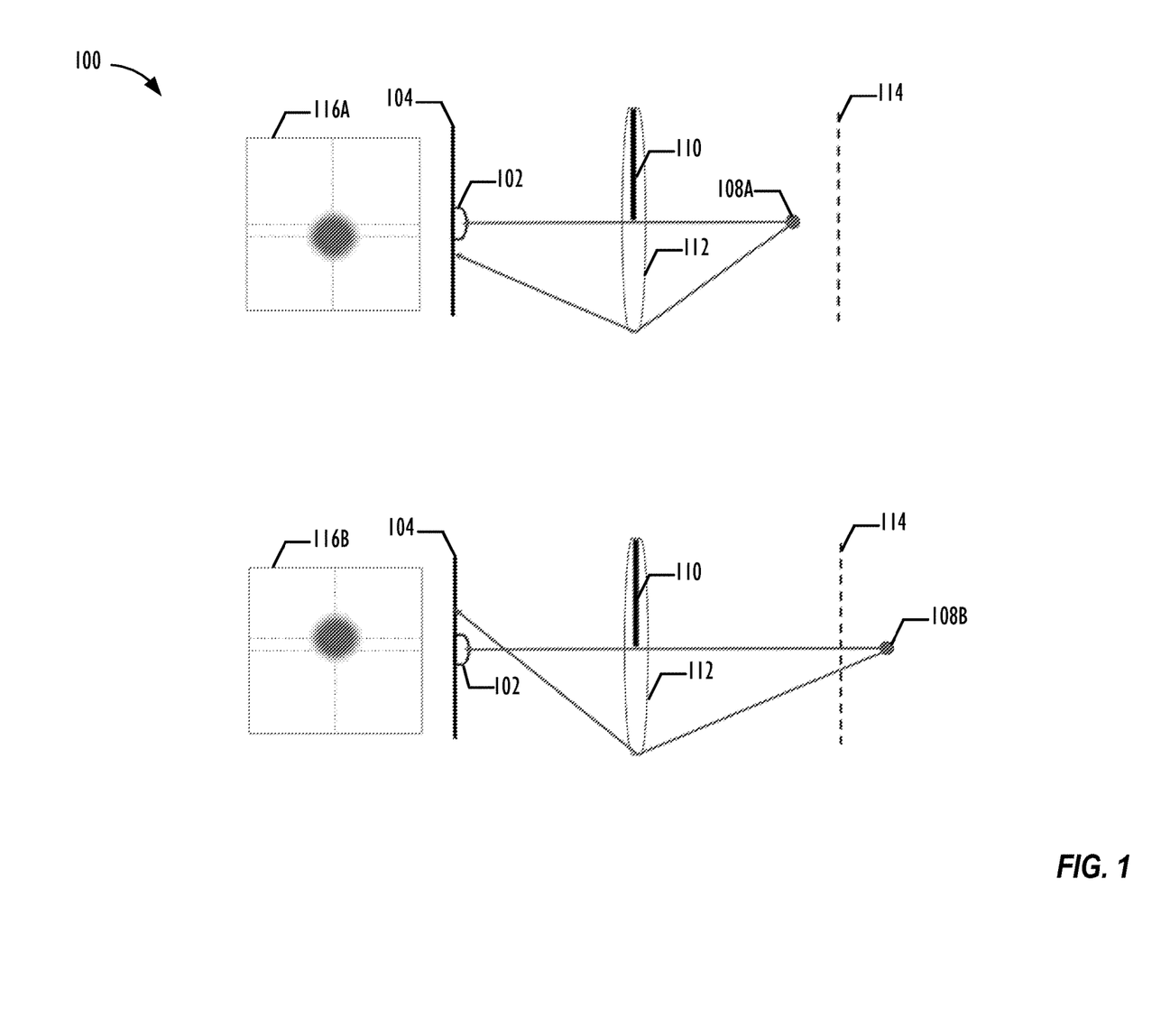
FIG. 1 illustrates an example left-shielded PD pixel, in accordance with aspects of the present disclosure.

Discussion will turn now to the characteristics of an exemplary PD pixel, in order to address how a PD pixel may be used to produce disparity estimates for a captured scene. Referring now to FIG. 1, which illustrates an example PD pixel 100, in accordance with aspects of the present disclosure. Generally, a PD pixel 100 has a direction-dependent light sensitivity. In this example, the direction-dependent light sensitivity is provided by a physical barrier covering a portion of a light sensing pixel. These pixels may also be referred to as shielded PD pixels. In other examples of PD pixels, optical components, such as split pixels, may be used to provide direction-dependent light sensitivity. In certain cases, a microlens disposed over the respective split pixels, as a part of a microlens array, may be used to provide the directional dependent light sensitivity. This microlens may overlay multiple sub-pixels and these sub-pixels may be individually read to obtain a direction-dependent subset of light from the microlens. The PD pixel 100 includes a sensing pixel 102, of an image sensor 104, which captures incoming light reflected from an object 108A and 108B. Generally, a camera and lens have a focus plane 114, which is a virtual plane, parallel to the plane of the sensor, representing an area in front of the camera of sharpest focus. Objects on the focus plane 114 would be in focus. The focus plane 114 can be adjusted, for example, closer or further from the sensor by adjusting the focus of the camera and lens. Objects not on the focus plane, such as object 108A and object 108B appear out of focus on respective sensor images 116A and 116B. In a non-PD, e.g., unshielded pixel, observing the entire light field, the object 108A closer than the focus plane 114, and the object 108B further than the focus plane 114 would both appear blurry, but there would be no shift in the sensor image as between object 108A and 108B.

For the PD pixel 100, a portion of the field of view of the sensing pixel 102 is partially blocked by a shield 110. In this example, the shield 110 is located, for example, on a lens 112, but the shield 110 may be placed in other locations, such as on the sensing pixel 102 itself, or may be implemented by disabling or removing portions of the sensing pixel 102. In certain cases, a shield may be virtually implemented, for example, by splitting a pixel in half and using half of the pixel to observe the light field. In other cases, the number of pixels may be effectively doubled and data from two pixels may be binned (e.g., fused) for a virtual non-PD pixel and data from a single pixel used for a virtual PD pixel. In certain cases, approximately half of the sensing pixel 102 may be covered by the shield 110. In other cases, the shield 110 may cover a third, a fourth, or some other fraction of the sensing pixel 102. The sensing pixel 102 can be partially-shielded by covering the right, left, top, or bottom portions of the sensing pixel 102. Other portions of the sensing pixel 102 may be covered as well, such as a middle portion, diagonal portion, or other fraction of the sensing pixel 102. The sensing pixel 102 observes only a partial light field that is not blocked by the shield 110. As the sensing pixel 102 is partially shielded by the shield 110, objects that are not within the focus plane 114 will appear to be shifted. The specific direction of the shift depends on what portion of the sensor is shielded and the position of the object in comparison to the focus plane. Here, object 108A, being closer than the focus plane 114, would appear in the corresponding sensor image 116A as being shifted in a direction, here down. In the example, object 108B, being further than the focus plane 114, would appear in the corresponding sensor image 116B, as being shifted in an opposite direction, i.e., shifted upwards. This shift can be used to help calculate disparity information, for example, by determining a correspondence between an image generated from left PD pixels and another image, such as a full resolution image of the same scene.

Generally, the location information for the PD pixels may be obtained, for example, from a memory or from the sensor.

In certain cases, location information for the PD pixels may be based on a predetermined location or known pattern. This predetermined location or pattern may be stored as metadata. In other cases, location information for the PD pixels may be detected and stored, for example, during a calibration routine or detection process.

Figure 2:
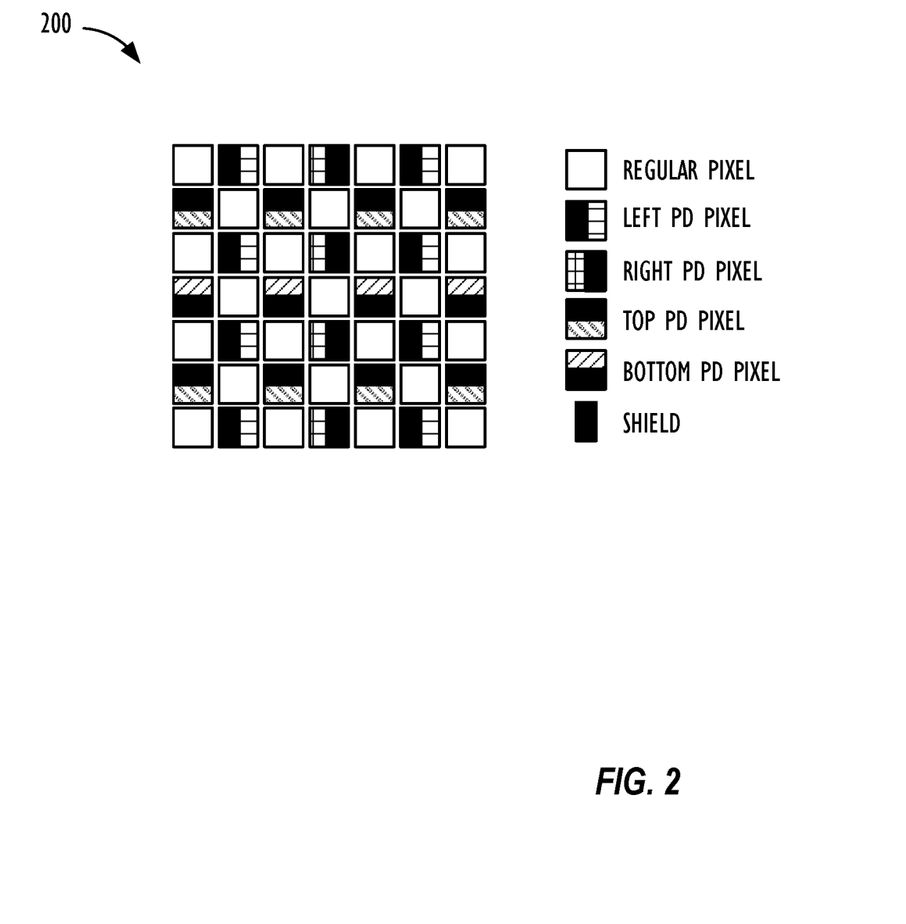
FIG. 2 shows an illustrative image sensor, in accordance with aspects of the present disclosure.

FIG. 2 illustrates an example image sensor 200, in accordance with aspects of the present disclosure. The image sensor 200 includes four types of PD pixels including left PD pixels, right PD pixels, top PD pixels, and bottom PD pixels laid out on the image sensor 200. The PD pixels may be laid out in a defined pattern, or randomly, across the image sensor 200. PD pixels may be sparsely distributed across the image sensor 200, such that less than half of the pixels are PD pixels. In certain cases, three to ten percent of the sensing pixels of the image sensor 200 may be PD pixels. In this example, the PD pixels are laid out in sparse pattern, however, other in other cases, the PD pixels may not be laid out according to a defined pattern or a comparatively more dense distribution of PD pixels may be used. In certain cases, there may be more of some types of PD pixels than other types of PD pixels.

A PD pixel image may be generated based on image information gathered from just PD pixels and the location information for the PD pixels, similar to how an image may be generated for non-PD pixels. Separate PD pixel images can be generated for each type of PD pixel. For example, a left PD pixel image can be generated based on image information gathered from the left PD pixels, a right PD pixel image can be generated based on information from the right PD pixels, and so on. As discussed above, shielded PD pixels have a portion of a sensing pixel blocked off, or shielded from light. This results in less incoming light to the sensing pixel and effectively a smaller aperture as compared to regular, i.e., non-PD, light sensing pixels of an image sensor. For a shielded PD pixel having the same light sensitivity and exposure time as a non-PD pixel, a pixel output of the shielded PD pixel will be darker and potentially noisier than a pixel output of the non-PD pixel. Additionally, if the PD pixels are sparsely distributed, the effective resolution of a PD pixel image created by aggregating the output of said PD pixels is lower than the resolution of the image sensor. Where a PD pixel image is generated from specific types of PD pixels, the effective resolution may be even lower (e.g., one-fourth of the effective resolution of PD pixel image, in the event that only one in every four PD pixels is utilized).

The reduced resolution, higher noise, and darker overall images make finding correspondences between the PD pixel images and other images of the scene, such as images generated using specific types of PD pixels, or full resolution images, difficult. Generally, disparity information can be generated by corresponding pixels or patches of pixels from one image of a scene to another image of the same scene taken at a different location, e.g., when a geometric relationship between where the pictures are taken is known. While comparing a PD pixel image generated from one type of PD pixel (e.g., left PD pixels) and another PD pixel image generated from another type of PD pixels (e.g., right PD pixels) is possible, where PD pixel are sparsely distributed on an image sensor, aligning the PD pixel images may be difficult, as the different types of PD pixels may or may not be co-located on the sensor, the disparity is limited (e.g., the observed shift is small) due to the effectively smaller aperture, the resolution is limited, and aliasing artifacts and increased noise that occur.

A PD pixel image may be thought of as an image captured through a constricted aperture at a slightly different defocusing-dependent viewpoint, while the main full resolution image may be thought of as an image captured through the full aperture. PD pixel images may be corresponded with the higher resolution original image derived from the non-PD pixels, while taking into account that PD pixel images are taken from the high-resolution image, but are sparsely sampled. By corresponding the PD pixel images with the higher resolution (e.g., full resolution) image, correspondence may be performed at a higher resolution, and the full resolution image is less noisy than the PD pixel images, allowing for a higher spatial resolution disparity estimation. While described as a full resolution image in this example, other embodiments may utilize a higher resolution image having a resolution greater than the resolution of the PD pixel images.

Figure 3:
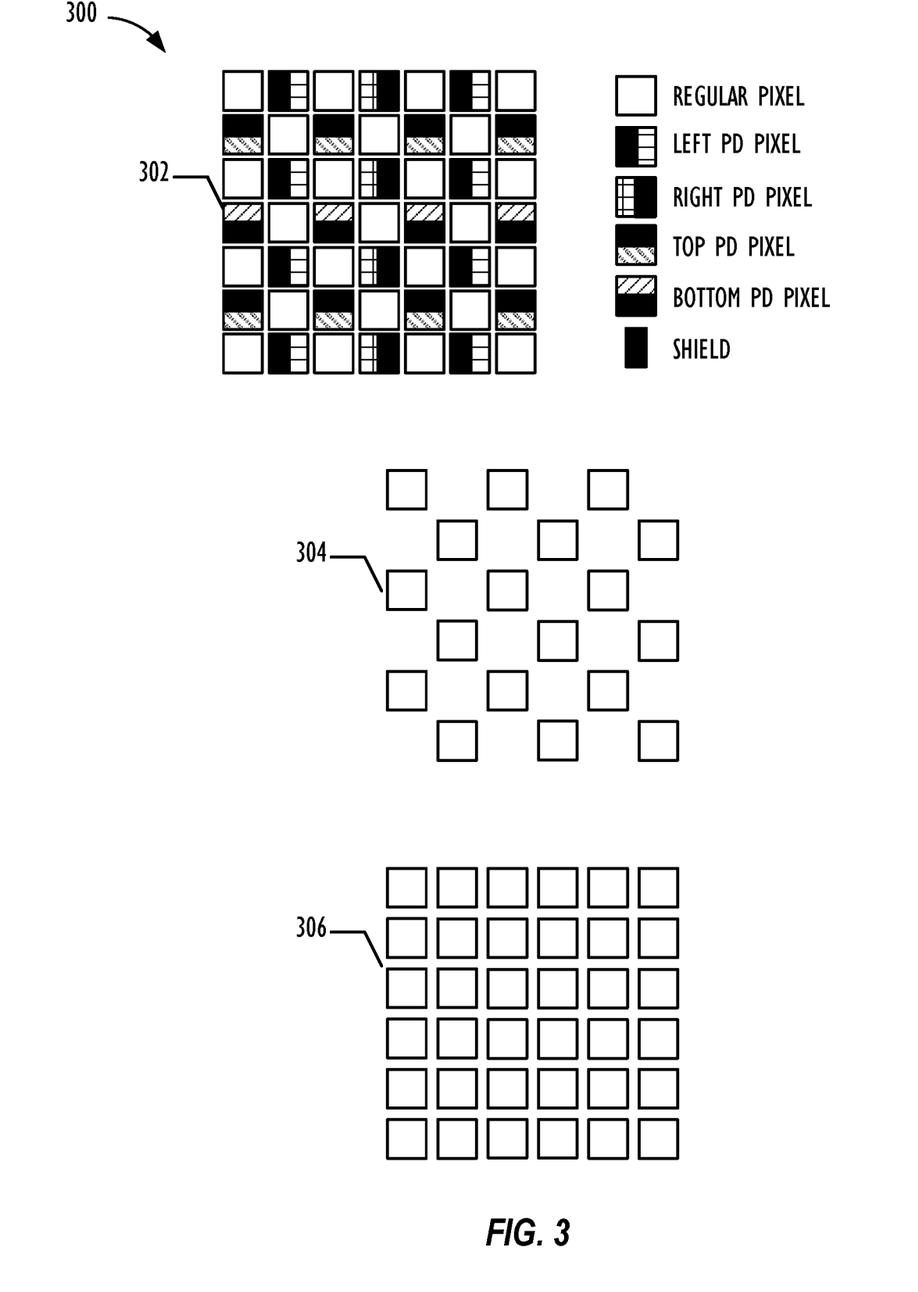
FIG. 3 illustrates an example technique for constructing a full-resolution image, in accordance with aspects of the present disclosure.

FIG. 3 illustrates an example technique 300 for constructing a full-resolution image, in accordance with aspects of the present disclosure. Image sensor 302 includes four types of PD pixels, as well as regular (i.e., non-PD) pixels. To generate a full resolution image from the regular pixels, once an image is captured from image sensor 302, image data gathered from the PD pixels can be removed to obtain regular pixel image 304 based on just the image data from the regular pixels.

The holes in the regular pixel image 304 where the PD pixels were located may be filled in based on neighboring regular pixels. This hole-filling may be performed using standard interpolation techniques, such as up-sampling interpolation or gradient-based interpolation, to generate a full resolution interpolated image 306. The interpolated image 306 and/or regular pixel image may be demosaiced to obtain just the image information from a single color channel, such as the green channel. An image constructed from a single color channel may also be referred to as a luminance image.

In certain cases, interpolated image 306 may comprise a center green image generated from the green channel of the image sensor 302 and include image data corresponding to pixels of the image sensor 302 which capture green light. In this example, the green channel is used as most image sensors utilize a color filter that includes red, green, or blue filters for each pixel, and that has more green-sensitive pixels than red- or blue-sensitive pixels (e.g., a Bayer filter). Other examples may use another color channel to create the interpolated image, such as the red or blue color channel. The color channel used for the center image generally matches the color channel of the PD pixels where the PD pixels and regular, i.e., non-PD, pixels are of the same color.

Traditional stereo matching schemes generally attempt to match each pixel of, for example, a PD pixel image to a specific pixel of the interpolated image. However, such matching schemes are not well suited for noisy images, or situations where one image is sparsely sampled as compared to the other image. Additionally, observed disparity using shielded pixels is generally fairly small, as the geometric displacement between the different images is very small and sub-pixel accuracy would be useful. Matching PD pixel images directly with other PD pixel images generally may not provide this level of accuracy, as different types of PD pixels may not be co-located. While the PD pixel images have a different resolution than the interpolated image 306, searching for correspondences between the two images may still be performed by a more robust matching scheme.

Matching PD Pixel Images

Figure 4:
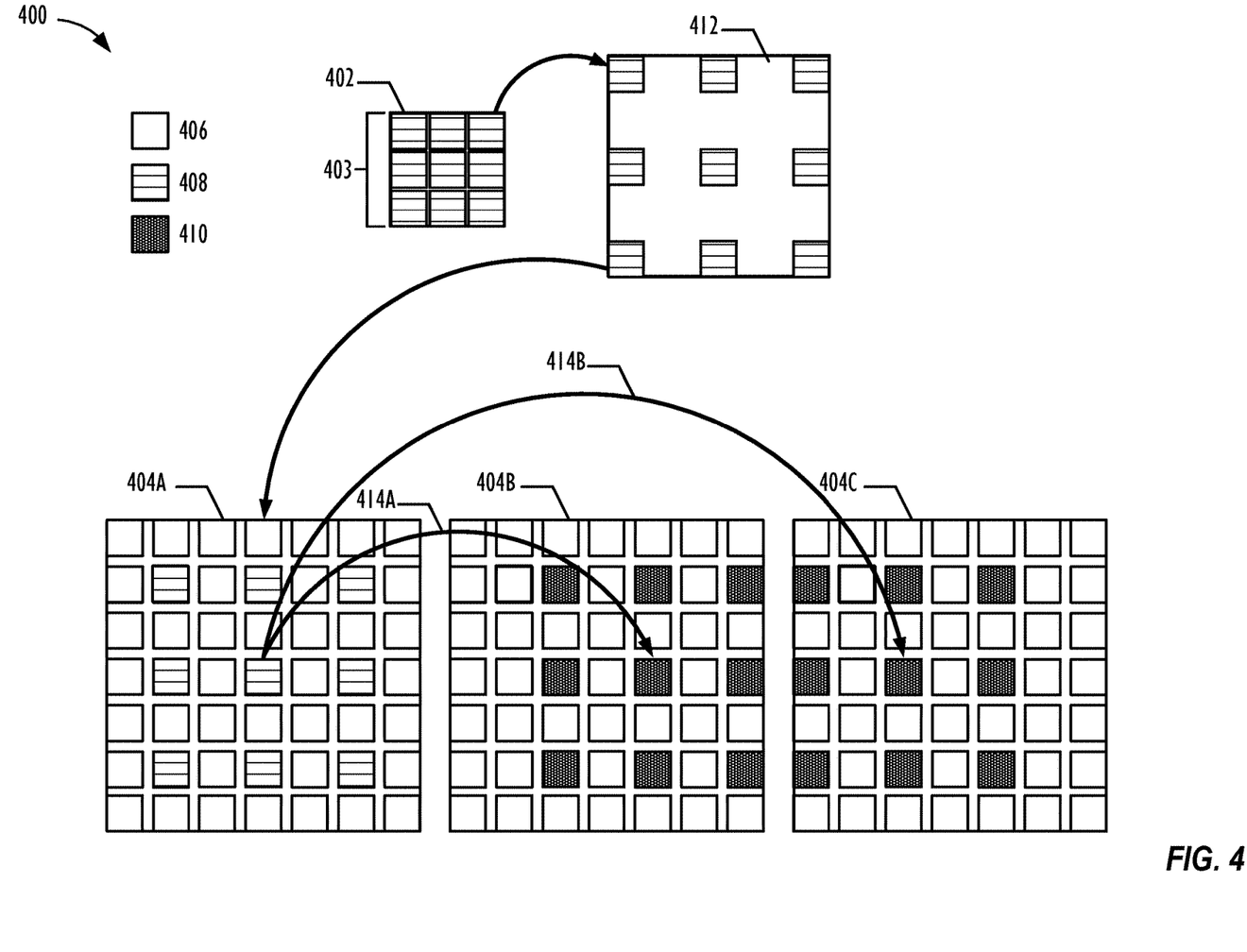
FIG. 4 illustrates a pixel matching scheme for images having different resolutions, in accordance with aspects of the present disclosure.

FIG. 4 illustrates a pixel matching scheme 400 for images having different resolutions, in accordance with aspects of the present disclosure. PD pixels 408 are located at known locations on the image sensor and the PD pixels 408 are taken from the full resolution picture to generate a PD pixel image 402. Rather than attempting to directly match a PD pixel image 402, such as the PD pixel image generated by the left PD pixels, against the interpolated full resolution image, the PD pixels 408 of the PD pixel image 402 may first be spread out in a decimated window 412, wherein the decimated window 412 refers to the spread out pixels of the PD pixel image 402, based on where the respective PD pixels 408 are located with respect to the pixels of the full resolution picture 404A-404C. Matching of the PD pixels 408 of the PD pixel image 402 may then be performed in sparse 3×3 observation windows 414A, 414B around neighboring regular, i.e., non-PD, pixels 410. Here, the PD pixels 408 of the PD pixel image 402 may be matched against the full resolution picture at zero disparity (d=0) 404A, i.e., at the location of the PD pixel, matched at +1 disparity (d=1) 404B, and matched again at −1 disparity (d=−1) 404C. While in this example, disparity at 1, 0, −1 are matched against, additional, or fewer, disparities may also be matched against in other examples. Regular pixels 406 are not mapped against in this example. Matching PD pixels in a relatively low resolution observation window around neighboring regular pixels helps provide a disparity estimate at a lower resolution. This disparity estimation may be propagated to higher resolutions, such as by expanding the matching area and including observations from additional PD pixels to refine the disparity estimate to help gain specificity and finer details.

In certain cases, other observation window sizes may be used instead of a 3×3 observation window, and the exact observation window size used in a given implementation may be determined as a trade-off between multiple factors which include, among other factors, discriminative ability to make the correlation, edge detection, and processing speed. Where local smoothness can be assumed, for example, a larger observation window, such as a 5×5 window, may be desirable and, conversely, a smaller observation window, such as a 2×2 window, may be used where local smoothness cannot be assumed, such as in the presence of sharp edges in the scene. In certain cases, the size of the window may be adjustable on demand. For example, the size of the observation window may be adjustable based on an image mode, such as portrait, action, etc. As another example, the observation window may be adjusted, or differently-sized observation windows may be used at different portions of the image, for example, based on whether a portion of the image is texture rich.

According to certain aspects, matching within the observation window may be performed using windowed normalized cross correlation (NCC), which is robust to noise and intensity differences. The exact matching technique used is a design choice, and other matching techniques may also be used, including, but not limited to, summed absolute differences, census transform, and/or binary robust independent elementary features (BRIEF). Matching across the observation window, for NCC, can be expressed in a function, shown below, where $\Omega$ is a 3×3 decimated neighborhood for which the NCC function is performed, x' and y' are coordinates of the full resolution picture and d(x,y) is the disparity from the PD pixel location on the full resolution image identifying which neighboring pixel is being operated on, and the summation may be performed over the selected set of a type of PD pixels that make up a PD pixel image:

$$E_{(x,y) \in \text{selected PD pixels}} |\text{NCC}_\Omega(I_C(x'+d(x,y),y'),I_f(x,y))| \quad \text{(Eqn. 1).}$$

While this example uses a 3×3 decimated neighborhood, other sized decimated neighborhoods may be used, such as 2×2, 5×5, 7×7, etc.

Generally, an NCC function outputs a correlation value indicating how well two images match, where a higher correlation value indicates that the images being matched are more correlated. A cost value may be calculated based on this correlation value. In this example, a cost value may be calculated from the correlation value by subtracting the correlation value from 1. In certain implementations, higher cost values could indicate a lower correlation, and lower cost values a higher correlation. In certain cases, correlation values may also be normalized or otherwise processed for comparison. The cost values may be projected into a cost space, e.g., a uniform in-memory representation of cost values, corresponding to where pixels, i.e., both regular (i.e., non-PD) pixels and PD pixels, are located on the image sensor. For example, for a top shielded PD pixel, which is sensitive to disparity in a top/bottom axis, the correlation value as between the PD pixel and the interpolated image at the PD pixel location may be determined. Additionally, the correlation value as between the PD pixel and the interpolated image at the PD pixel location plus one pixel (e.g., a location one pixel on top of the PD pixel) may also be determined. Likewise, additional correlation values may be determined for the PD pixel location +2, −1, −2, etc. Generally, while this correlation determination may be at full resolution, such a high resolution is likely to result in noisy results with too many false matches. Rather, matching may be performed for a smaller area located within a predetermined distance around a given PD pixel. For example, the predetermined distance may be ten pixels centered around the PD pixel and extending ten pixels from the PD pixel in a direction. This direction may be based on the type of PD pixel (e.g., top, bottom, left, right). A search of the cost values may then be performed to determine the best match as between pixels of the PD pixel images and the regular pixels based on the cost value. For example, a minimization operation may be performed based on the cost values. The disparity value associated with the best match may be associated with the respective pixel. In the cost space, pixels can be represented by the cost value associated with the respective pixel. The cost space may be expanded to encompass additional PD pixels. In certain cases, as additional PD pixels are included, certain cells (e.g., observation points) may include multiple cost values based on different PD pixels.

Matching may be performed for each of the different PD pixel images generated from the different types of PD pixels (e.g., left, right, top and bottom) and the disparity values associated with matched cost values can be projected to a uniform grid of disparity values. In certain cases, this uniform grid may be an extension of the cost space.

Figure 5:
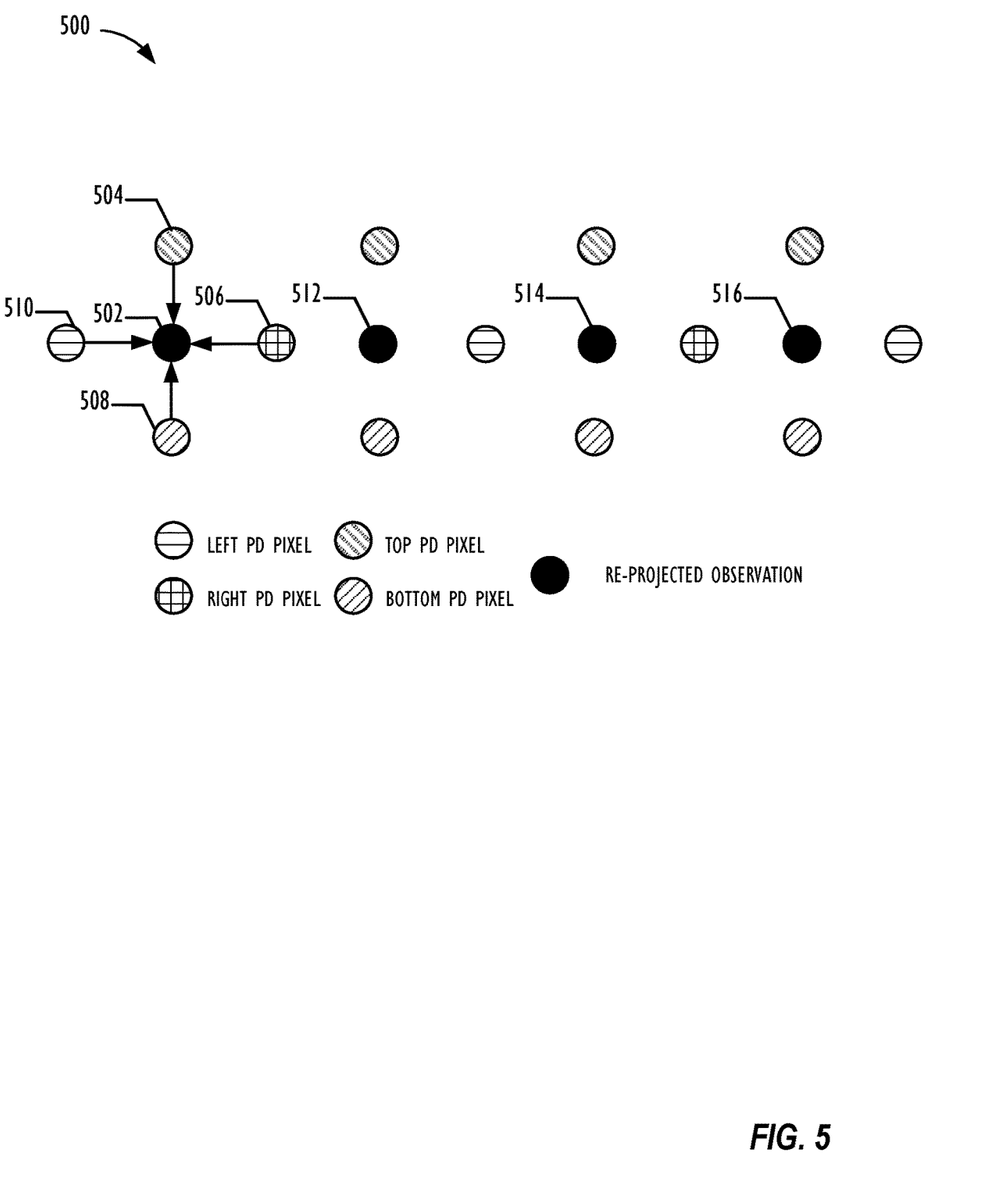
FIG. 5 illustrates an example cost space, in accordance with aspects of the present disclosure.

FIG. 5 illustrates an example grid 500, in accordance with aspects of the present disclosure. Points on the grid 500 may correlate to locations of the image. In certain cases, the grid may have a resolution based on the full image resolution. As illustrated, disparity values associated with four types of PD pixels have been projected into the exemplary grid 500. Cost values for each disparity can also be projected into the grid 500. In certain cases, multiple cost disparity values may be calculated for certain pixels. In this example, a disparity for re-projected observation point 502 may be observed based on disparity values associated with PD pixels 504, 506, 508, and 510. Similarly, re-projected observation points 512, 514, and 516 may each have their disparity values determined based on multiple observations from different types of PD pixels. Generally, increasing the number of re-projected observations allows for increased disparity resolution, but can result in increased noise and decreased robustness. Conversely, fewer re-projected observations tend to increase robustness, but decrease resolution. Adjusting a size or number of PD pixels used to determine the re-projected observations allows for the resolution of the output disparity map to be adjusted to help balance the noise and robustness based on, for example, what the disparity map may be used for.

Simply averaging or fusing the disparity values of multiple observations for the re-projected observations having multiple observations is unlikely to obtain a high quality result where the different types of PD pixels are not co-located. Averaging assumes that the signals are identical across the views provided by the different PD pixels. However, an object observed by a first PD pixel may be different than another object observed by a second PD pixel, even if the two PD pixels are relatively close to each other, such as an image having a horizontal fence in the foreground and a person peering over the fence. Thus, re-projected observations 504, 506, 508, and 510 may have multiple, potentially conflicting, disparity values, which can dilute the resulting signal to noise ratio (SNR).

Weighting of disparity values based on, for example, how discriminatory a particular disparity value is expected to be may be used to reduce such potential conflicts. For example, a top-shielded or bottom-shielded PD pixel may provide a more accurate or reliable indication of scene disparity in regions of the scene that vary as the viewpoint into the scene shifts in a vertical axial direction; whereas, a left-shielded or right-shielded PD pixel may provide a more accurate or reliable indication of scene disparity in regions of the scene that vary as the viewpoint into the scene shifts in a horizontal axial direction. As another example, cost values for a particular PD pixel across multiple observation windows may also be used for weighting the disparity value. For example, where the cost values for a set of observations at different tested disparities for a PD pixel are relatively similar (e.g., the cost surface is relatively smooth), then the disparity value determined for the PD pixel is likely less representative of a change in depth of objects in the image and may thus be weighted less when re-projected onto points in the uniformly-spaced grid of disparity values. However, if there are relatively large changes in the cost values for a set of observations at different tested disparities for the PD pixel, then the disparity value determined for the PD pixel is more likely to be an accurate indicator of scene disparity at the position of the PD pixel. The disparity values of PD pixels that are more likely to be discriminative (i.e., PD pixels that show more variation in the cost values computed at the different tested disparity positions) can then be more heavily weighted during any subsequent reprojections onto points in a uniformly-spaced grid of disparity values. In certain cases where a particular observation point's value is determined via a weighting combination of the disparities determined for multiple PD pixels, the PD pixels' disparity values may be weighted based on, for example, how well an associated PD pixel can discriminate disparity in a particular axial direction (e.g., left/right for left/right PD pixels and top/bottom for top/bottom PD pixels). As a single-shielded PD pixel is generally able to discriminate along a single axis, cost values associated with that PD pixel are more likely to vary (i.e., indicating the ability to accurately discriminate disparity in the scene) along that axis. A final disparity value for re-projected observations having multiple observations can then be determined based on the weights.

As an example, for an image with a horizontal fence in the foreground, the cost values of a first, e.g., horizontally-shielded, PD pixel that is located in a part of the image with the fence may all be fairly similar at different tested disparities, as the fence may be fairly regular in the horizontal direction. The disparity values for s first PD pixel may then receive relatively little weight in any reprojections onto points in a uniformly-spaced grid of disparity values. Conversely, for a second, e.g., vertically-shielded, PD pixel capturing a part of the scene near the top edge of the fence, there may be large change in cost values across the different tested disparities for the second pixel. The determined disparity values of this second PD pixel may then be relatively more heavily weighted in any reprojections onto points in a uniformly-spaced grid of disparity values.

Other techniques for determining a final disparity cost value for the re-projected observations having multiple observations may also be used. For example, disparity cost values having a higher correlation may be more heavily weighted, or other processing applied based on the signal to be preserved, such as disparity cost values within or outside of a certain range. In certain cases, multiple grids may also be used, one for each axis. A disparity map may be generated using disparities associated with the final disparity cost values.

Figure 6:
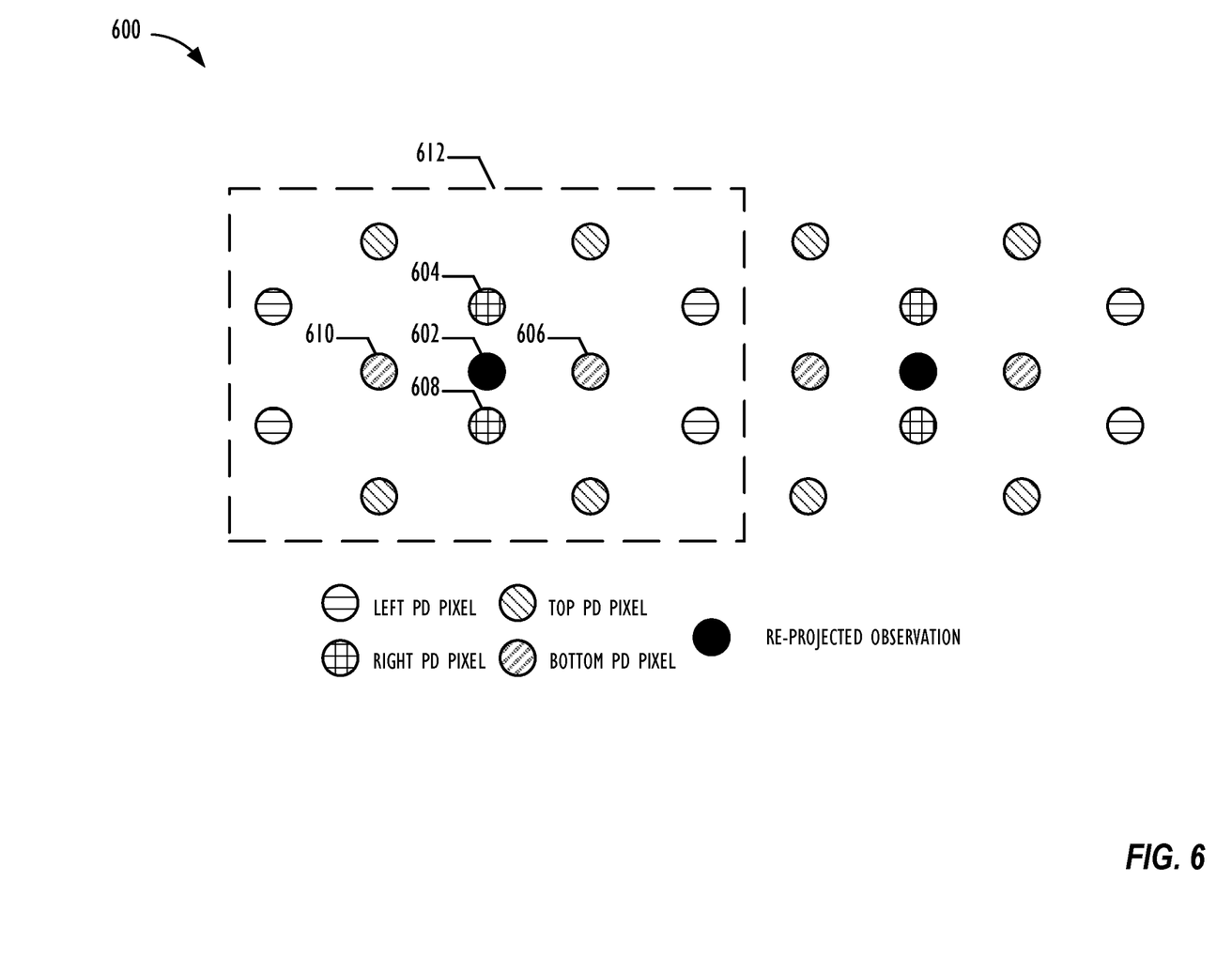
FIG. 6 illustrates adjusting the disparity resolution, in accordance with aspects of the present disclosure.

FIG. 6 illustrates adjusting the disparity resolution 600, in accordance with aspects of the present disclosure. In certain cases, a higher signal-to-noise ratio (SNR) may be desirable. As PD pixel observations are re-projected into a uniform grid of disparity values, a higher SNR may be obtained at a cost of decreased disparity resolution by taking into consideration signals from additional PD pixels around the re-projected observation point 602 to be measured. In addition to disparity values from PD pixels 604, 606, 608, and 610, the disparity values from each PD pixel in observation window 612 may be considered to determine a disparity value for re-projected observation point 602 by interpolating the disparity values within the observation window 612. This lowers the effective spatial specificity, but can significantly increase the SNR. The size of the observation window 612 may be adjusted by first starting with a large observation window 612 that gathers PD pixel observations from a larger area. This allows for a higher SNR but lower disparity resolution. The size of the observation window 612 may then be reduced until a desired disparity resolution or a SNR threshold is reached.

Figure 7:
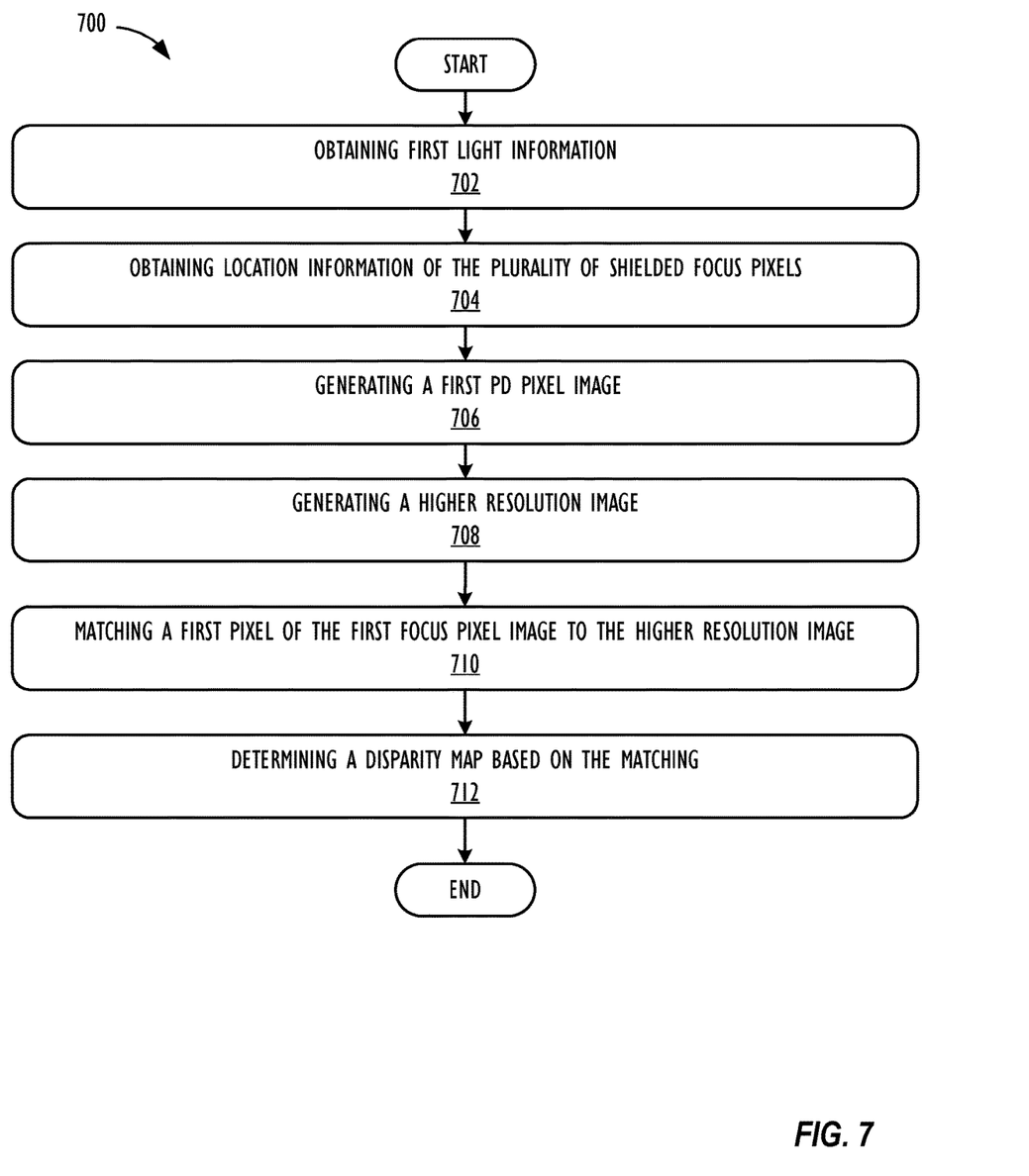
FIG. 7 is a flow diagram illustrating a technique for image processing, in accordance with aspects of the present disclosure.

FIG. 7 is a flow diagram illustrating a technique 700 for image processing by a processor, in accordance with aspects of the present disclosure. At step 702, the technique proceeds by first light information for a scene is obtained from a set of light-sensitive pixels, the light-sensitive pixels including a plurality of PD pixels and a plurality of regular (i.e., non-PD) pixels distributed across an image sensor. Generally, PD pixels comprise a light-sensitive pixel having a portion of a field of the view of the PD pixel blocked. The PD pixels may be sparsely distributed amongst the regular (i.e., non-PD) pixels on the image sensor. Next, at step 704, the technique proceeds by obtaining location information associated with each of the plurality of PD pixels. Generally, the locations of the PD pixels have known locations that can be obtained, for example, through metadata from the image sensor, based on a known pattern, or that has been previously determined and stored in a memory. Then at step 706, the technique proceeds by generating a first PD pixel image from the first light information based on light information obtained from the plurality of PD pixels. Light information from one or more types of PD pixels may be extracted from the light information and used to generate a PD pixel image. The plurality of PD pixels may include a plurality of PD pixel types, wherein each PD pixel type corresponds with the portion of a field of the view of the PD pixel blocked. At step 708, generating a higher resolution image from the first light information. In certain cases, the light information may be obtained from the plurality of regular, i.e., non-PD, pixels may be interpolated to produce a higher resolution, or full resolution, image. Once light information associated with the PD pixels are extracted, the holes where the PD pixels light information was extracted may be filled by extrapolating the light information from the regular pixels. Then, at step 710, the technique proceeds by matching a first pixel of the first PD pixel image to the higher resolution image. In some cases, this matching may be based on a location of the first pixel and an observation window size in order to obtain a first set of cost values indicating how well the first pixel matches pixels of the full resolution image within the observation window. This matching may be performed using a matching technique, which may include, but is not limited to: windowed normalized cross correlation, summed absolute differences, census transform, and/or binary robust independent elementary features (BRIEF) algorithm. This matching may produce a set of correlations between the first pixel and non-PD pixels within a predetermined distance of the first pixel and these correlations may be used to determine the first set of cost values projected to a cost space grid to help select a match. Additional cost values associated with other PD pixels of this type and other types may also be used to estimate disparity values at the location of the various PD pixels. The estimated disparity values for the various PD pixels may then be re-projected at a different resolution, e.g., onto a uniform grid of points distributed over the image sensor. Where multiple PD pixel disparity estimates are used to determine a disparity value for a single point on the grid, a weighted calculation, such as a weighted average, weighted sum, etc., of the disparity values associated with the multiple contributing PD pixels may be used. Then at 714, the technique proceeds by determining a disparity map for an image associated with the first light information, based on the generated grid. According to certain aspects, the disparity map may be based on the cost values. The disparity map may be converted to depth.

Exemplary Hardware And Software

Figure 8:
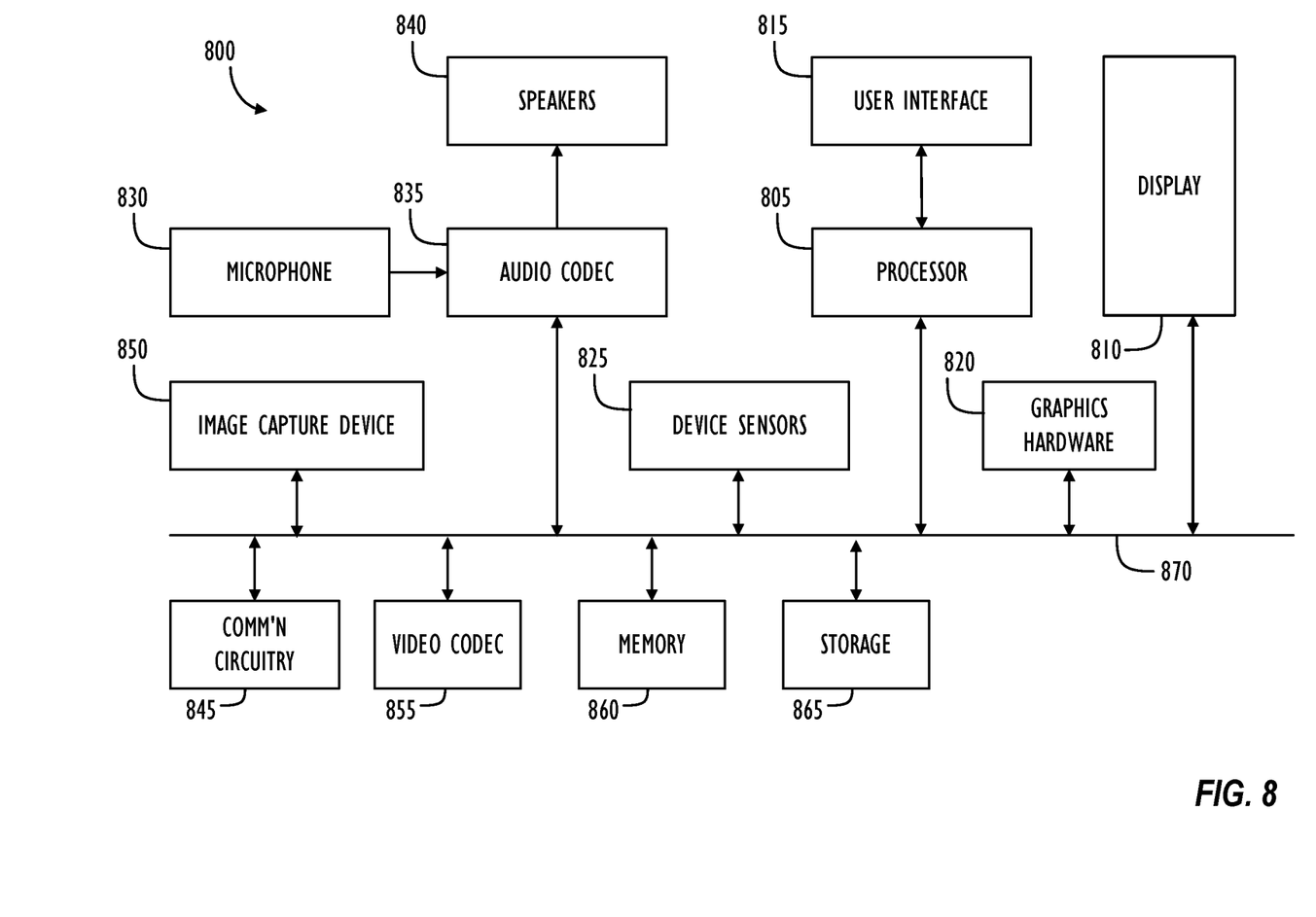
FIG. 8 shows a functional block diagram of a programmable electronic device, according to one embodiment.

Referring now to FIG. 8, a simplified functional block diagram of illustrative programmable electronic device 800 is shown according to one embodiment. Electronic device 800 could be, for example, a mobile telephone, personal media device, portable camera, or a tablet, notebook or desktop computer system. As shown, electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, image capture device 850, which may, e.g., comprise multiple camera units/optical image sensors having different characteristics or abilities (e.g., High Dynamic Range (HDR), Optical Image Stabilization (OIS) systems, optical zoom, digital zoom, etc.), video codec(s) 855, memory 860, storage 865, and communications bus 870.

Processor 805 may execute instructions necessary to carry out or control the operation of many functions performed by electronic device 800 (e.g., such as the generation and/or processing of PD pixel information and disparity/depth information in accordance with the various embodiments described herein). Processor 805 may, for instance, drive display 810 and receive user input from user interface 815. User interface 815 can take a variety of forms, such as a button, keypad, dial, a click wheel, keyboard, display screen and/or a touch screen. User interface 815 could, for example, be the conduit through which a user may view a captured video stream and/or indicate particular frame(s) that the user would like to capture (e.g., by clicking on a physical or virtual button at the moment the desired frame is being displayed on the device's display screen). In one embodiment, display 810 may display a video stream as it is captured while processor 805 and/or graphics hardware 820 and/or image capture circuitry contemporaneously generate and store the video stream in memory 860 and/or storage 865. Processor 805 may be a system-on-chip such as those found in mobile devices and include one or more dedicated graphics processing units (GPUs). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 perform computational tasks. In one embodiment, graphics hardware 820 may include one or more programmable graphics processing units (GPUs).

Image capture device 850 may comprise one or more camera units configured to capture images, e.g., images which may be processed to generate depth/disparity information for such captured images, e.g., in accordance with this disclosure. Output from image capture device 850 may be processed, at least in part, by video codec(s) 855 and/or processor 805 and/or graphics hardware 820, and/or a dedicated image processing unit or image signal processor incorporated within image capture device 850. Images so captured may be stored in memory 860 and/or storage 865. Memory 860 may include one or more different types of media used by processor 805, graphics hardware 820, and image capture device 850 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to retain computer program instructions or code organized into one or more modules and written in any desired computer programming language. When executed by, for example, processor 805, such computer program code may implement one or more of the methods or processes described herein.

It is to be understood that the above description is intended to be illustrative, and not restrictive. For example, the use of PD pixels to provide disparity information and improve their quality as described in this disclosure can be used with many different types of sensors and types of PD pixel and is not dependent on the specific hardware involved. Also, in this disclosure, both depth and disparity estimation are referred to. It is to be understood that, broadly speaking, disparity may be viewed as inversely proportional to depth.

Many other embodiments will be apparent to those of skill in the art upon reviewing the above description. The scope of the invention therefore should be determined with reference to the appended claims, along with the full scope of equivalents to which such claims are entitled.

The invention claimed is:

1. A computer-implemented method for image processing, the method comprising:
  obtaining first light information from a set of light-sensitive pixels for a scene, the set of light-sensitive pixels including a plurality of phase detection (PD) pixels and a plurality of non-PD pixels;
  obtaining location information associated with each of the plurality of PD pixels;
  generating a first PD pixel image from the first light information based on location information obtained from the plurality of PD pixels, wherein the first PD pixel image has a first resolution;
  generating a higher resolution image from the first light information obtained from the plurality of non-PD pixels, wherein the higher resolution image has a second resolution that is greater than the first resolution of the first PD pixel image;
  matching a first pixel of the first PD pixel image to the higher resolution image, wherein the matching is based on a set of correlations between the first pixel and non-PD pixels within a predetermined distance of the first pixel; and
  determining a disparity map for an image associated with the first light information, based on the matching.

2. The computer-implemented method of claim 1, wherein higher resolution image comprises an interpolated image generated by interpolating light information obtained from the plurality of non-PD pixels.

3. The computer-implemented method of claim 1, wherein the matching comprises matching the first pixel to the higher resolution image based on a location information associated with the first pixel and an observation window size, in order to obtain a first set of cost values indicating how well the first pixel matches pixels of the higher resolution image within an observation window.

4. The computer-implemented method of claim 3, wherein the plurality of PD pixels includes a plurality of PD pixel types, and wherein each PD pixel type corresponds with a direction the PD pixel is sensitive to.

5. The computer-implemented method of claim 4, wherein the first PD pixel image is generated based on a first type of PD pixels and further comprising:
  generating a second PD pixel image from the first light information based on light information obtained from a second type of PD pixels;
  matching a second pixel of the second PD pixel image to the higher resolution image based on a location of a second PD pixel associated with the second pixel within the observation window size to obtain a second set of cost values;
  determining that a point on a uniform grid is associated with values for both the first set of cost values and the second set of cost values; and
  determining a disparity value for the point based on a weighted average of the associated values from the first set of cost values and the second set of cost values.

6. The computer-implemented method of claim 5, wherein the weighted average is based on a weight assigned to cost values of a set of cost values based on how similar the cost values of the set of cost values are to each other.

7. The computer-implemented method of claim 4, wherein the higher resolution image comprises a full resolution image, wherein first PD pixel image is generated based on a first type of PD pixels, and wherein the first resolution is based on a number of the first type of PD pixels.

8. The computer-implemented method of claim 3, further comprising adjusting the observation window size based on one or more properties associated with the first light information.

9. The computer-implemented method of claim 3, further comprising generating a grid of disparity values based on the obtained first set of cost values.

10. The computer-implemented method of claim 1, wherein the first PD pixel has a direction dependent light sensitivity based on a portion of a field of view of the PD pixel that is blocked.

11. A non-transitory program storage device comprising instructions stored thereon to cause one or more processors to:
  obtain first light information from a set of light-sensitive pixels for a scene, the set of light-sensitive pixels including a plurality of phase detection (PD) pixels and a plurality of non-PD pixels;
  obtain location information for the plurality of PD pixels;
  generate a first PD pixel image from the first light information based on location information obtained from the plurality of PD pixels, wherein the first PD pixel image has a first resolution;
  generate a higher resolution image from the first light information obtained from the plurality of non-PD pixels, wherein the higher resolution image has a second resolution that is greater than the first resolution of the first PD pixel image;
  match a first pixel of the first PD pixel image to the higher resolution image, wherein the match is based on a set of correlations between the first pixel and non-PD pixels within a predetermined distance of the first pixel; and
  determine a disparity map for an image associated with the first light information, based on the match.

12. The non-transitory program storage device of claim 11, wherein higher resolution image comprises an interpolated image generated by interpolating light information obtained from the plurality of non-PD pixels.

13. The non-transitory program storage device of claim 11, wherein the instructions for matching the first pixel comprise the instructions to cause the one or more processors to match the first pixel of the first PD pixel image to the higher resolution image based on a location of the first pixel and an observation window size in order to obtain a first set of cost values indicating how well the first pixel matches pixels of the higher resolution image within an observation window.

14. The non-transitory program storage device of claim 13, wherein the plurality of PD pixels includes a plurality of PD pixel types, and wherein each PD pixel type corresponds with a direction the PD pixel is sensitive to.

15. The non-transitory program storage device of claim 14, wherein the first PD pixel image is generated based on a first type of PD pixels and wherein the instructions further cause the one or more processors to:
  generate a second PD pixel image from the first light information based on light information obtained from a second type of PD pixels;

match a second pixel of the second PD pixel image to the higher resolution image based on a location of a second PD pixel associated with the second pixel within the observation window size to obtain a second set of cost values;

determine that a point on a uniform grid is associated with values for both the first set of cost values and the second set of cost values; and determine a disparity value for the point based on a weighted average of the associated values from the first set of cost values and the second set of cost values.

16. The non-transitory program storage device of claim 15, wherein the weighted average is based on a weight assigned to cost values of a set of cost values based on how similar the cost values of the set of cost values are to each other.

17. The non-transitory program storage device of claim 14, wherein the higher resolution image comprises a full resolution image, wherein first PD pixel image is generated based on a first type of PD pixels, and wherein the first resolution is based on a number of the first type of PD pixels.

18. The non-transitory program storage device of claim 13, wherein the instructions further comprise instructions to cause the one or more processors to generate a grid of disparity values based on the obtained first set of cost values.

19. The non-transitory program storage device of claim 11, wherein the first PD pixel has a direction dependent light sensitivity based on a portion of a field of view of the PD pixel that is blocked.

20. An electronic device, comprising:
one or more image capture devices;
a display;
a user interface; and
one or more processors operatively coupled to a memory, wherein the one or more processors are configured to execute instructions stored in the memory causing the one or more processors to:
obtain first light information from a set of light-sensitive pixels for a scene, the set of light-sensitive pixels including a plurality of phase detection (PD) pixels and a plurality of non-PD pixels;
obtain location information associated with each of the plurality of PD pixels;
generate a first PD pixel image from the first light information based on location information obtained from the plurality of PD pixels, wherein the first PD pixel image has a first resolution;
obtain a higher resolution image having a second resolution greater than the first resolution of the first PD pixel image;
match a first pixel of the first PD pixel image to the higher resolution image, wherein the match is based on a set of correlations between the first pixel and non-PD pixels within a predetermined distance of the first pixel; and
determine a disparity map for an image associated with the first light information, based on the match.

21. The electronic device of claim 20, wherein the higher resolution image comprises an interpolated image generated by interpolating light information obtained from the plurality of non-PD pixels.

22. The electronic device of claim 20, wherein the one or more processors are configured to match the first pixel by executing instructions to cause the one or more processors to match the first pixel of the first PD pixel image to the higher resolution image based on a location of the first pixel and an observation window size in order to obtain a first set of cost values indicating how well the first pixel matches pixels of the higher resolution image within an observation window.

23. The electronic device of claim 22, wherein the one or more processors are configured to execute instructions to cause the one or more processors to generate a grid of disparity values based on the obtained first set of cost values.

24. The electronic device of claim 20, wherein the first PD pixel has a direction dependent light sensitivity based on a portion of a field of view of the PD pixel that is blocked.

* * * * *